United States Patent [19]

Schwarz

[11] 4,242,042
[45] Dec. 30, 1980

[54] TEMPERATURE CONTROL OF ENGINE CASE FOR CLEARANCE CONTROL

[75] Inventor: Frederick M. Schwarz, Glastonbury, Conn.

[73] Assignee: United Technologies Corporation, Hartford, Conn.

[21] Appl. No.: 906,394

[22] Filed: May 16, 1978

[51] Int. Cl.³ .................................................. F01D 11/08
[52] U.S. Cl. ...................................... 415/116; 415/175
[58] Field of Search .............. 415/115, 116, 175, 176, 415/178, 180, 117, 172 A

[56] References Cited

U.S. PATENT DOCUMENTS

| | | | |
|---|---|---|---|
| 3,730,640 | 5/1973 | Rice et al. | 415/117 |
| 3,736,069 | 5/1973 | Beam, Jr. et al. | 415/115 |
| 3,742,705 | 7/1973 | Sifford | 415/116 |
| 3,966,354 | 6/1976 | Patterson | 415/116 |
| 3,975,901 | 8/1976 | Hallinger et al. | 415/117 |
| 4,005,946 | 2/1977 | Brown et al. | 415/178 |
| 4,019,320 | 4/1977 | Redinger, Jr. et al. | 415/116 |
| 4,050,843 | 9/1977 | Needham et al. | 415/116 |
| 4,053,254 | 10/1977 | Chaplin et al. | 415/116 |

*Primary Examiner*—Everette A. Powell, Jr.
*Assistant Examiner*—A. N. Trausch
*Attorney, Agent, or Firm*—Norman Friedland

[57] ABSTRACT

Regulation of cool air admitted internally of a gas turbine engine into an annular space defined by the double wall construction consisting of the case and the outer air seals serve to control the leakage in and out of this space and the temperature of the engine case. Thus, the temperature range between the hot gas stream and the cool air acting on the engine case controls shrinkage and expansion of the case which in turn positions the seal relative to the tip of the rotating blades, which can be manifested as a function of engine power or other parameters.

7 Claims, 1 Drawing Figure

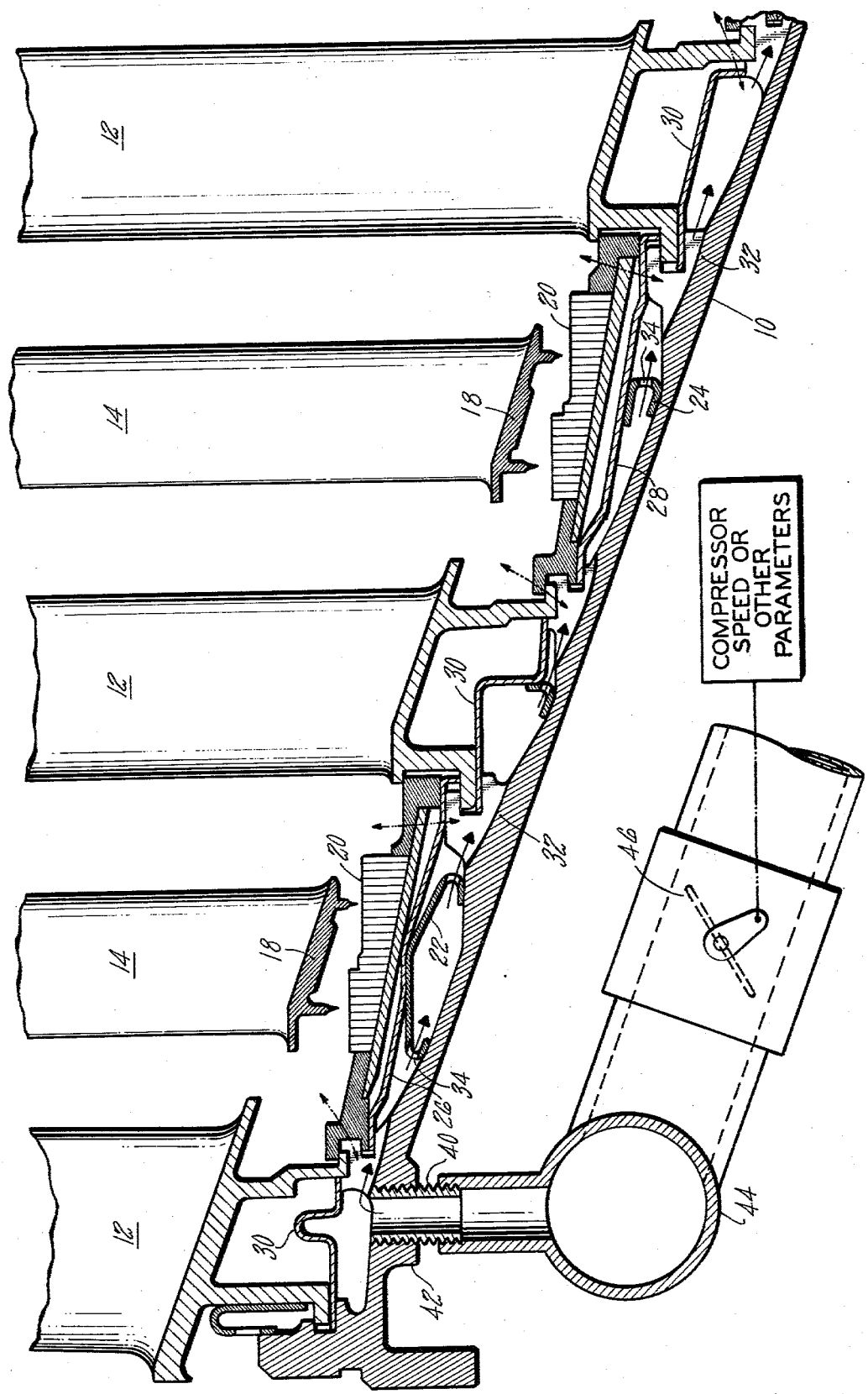

TEMPERATURE CONTROL OF ENGINE CASE FOR CLEARANCE CONTROL

BACKGROUND OF THE INVENTION

This invention relates to gas turbine engines and particularly to means for clearance control of the gap between the seal and rotating blade by controlling the temperature of the engine case by regulating the leakage into and out of the space defined by a double wall construction, which leakage is controlled by the back pressure regulated by the admittance of cool air into said space.

As has become well known in recent years, perhaps the most single advancement that has contributed the most for the fuel economy is the control of the gap between the turbine blades and the adjacent tip seals. A great deal of effort has been expended toward this end which is exemplified by U.S. Pat. Nos. 4,019,320 granted to I. H. Redinger, Jr., D. Sadowsky and P. P. Stripinis on Apr. 26, 1977 and U.S. Pat No. 3,975,901 granted to C. C. Halinger and R. Kervesten on Aug. 24, 1976. In the first patent, air impinges externally of the case to cause it to shrink and position the seal relative to the tip of the rotating blades. The latter mentioned patent directs either hot or cool air with valve means mounted internally of the case to the seal surface to cause the seal to be positioned relative to the tips of the rotating blades.

In the first instance, the use of impingement cooling requires externally mounted spray bars which in certain installations have proven to be efficacious. However, the use of spray bars are additional weight and must be suitably located. In certain installations, the maze of plumbing external of the engine case prohibits the use of spray bars.

The use of internally mounted heat sensitive valve means as suggested in the second mentioned patent has the problem of not only being difficult to fabricate and operate satisfactory during initial installation, but after engine deterioration over the course of its use the repeatability of the valve is adversely affected such that it doesn't respond at the same conditions that it did initially.

I have found that I can obviate the problems noted above by taking advantage of the leakage characteristics of the hardware surrounding the rotating blades, providing a double wall configuration and controlling the back pressure in the space between the double walls so as to regulate the leakage of cool air admitted externally thereto and the hot air in the adjacent gas path. By controlling this leakage this space is subjected to a large temperature differential, namely between the temperature of the cool air which can either be fan discharge or compressor bleed air and the temperature of the engine working fluid medium. Essentially, this allows a great deal of flexibility in the design of the clearance control as it allows the designer to select the seal clearance at any point in the flight envelope. Additionally the response is high allowing a broad range of seal clearance adjustments.

SUMMARY OF THE INVENTION

A feature of this invention is to provide for a gas turbine engine improved rotating blade tip clearance control.

One feature is to provide in the space defined by the casing and wall means adjacent the tips of the blades which has inherent leakage characteristics such that external cool air supply means controls the back pressure in that space for controlling leakage in and out thereof. The temperature of the air controls the thermal response of the case to effectuate seal movement relative to the tips of the blades. This clearance control is characterized by being relatively light in weight and low in cost.

Other features and advantages will be apparent from the specification and claims and from the accompanying drawings which illustrate an embodiment of the invention.

BRIEF DESCRIPTION OF THE DRAWINGS

The sole FIGURE is a partial view partly in section and partly in schematic of the low turbine section of a gas turbine engine showing the details of the invention.

DESCRIPTION OF THE PREFERRED EMBODIMENT

This invention in its preferred embodiment has utility in existing engines as for example the JT-9D manufactured by the Pratt & Whitney Aircraft division of United Technologies Corporation, the assignee of this application and it is to be understood that it can be employed in other engines with equal facility. Additionally, it should be appreciated that, as described, this invention is utilized to control the tip clearance of the low turbine blades, and that other clearance controls may be utilized to control the clearance of other sections in the engine.

As shown in the sole FIGURE, the low turbine section is encased by low turbine case 10 surrounding alternate rows of stators 12 and rotating blades 14 suitably supported in a well known manner. Adjacent the tips of the turbine blades 14 which may be shrouded with the typical turbine shroud 18, is the typical outer air seal 20 suitably supported to case 10. The outer air seal as is well known is fabricated into segments that are mated around the periphery of the rows of blades. Springs 22 and 24 are fitted between the seal and case 10 urging the seal in proximity to the tips of the blade. Sheet metal fairing elements 26 and 28 are sandwiched between the springs 22 and 24 respectively and the outer air seals 20 and form a smooth profile, noting it is well known that leakage is prevalent with these parts as it is with the mating metal to metal parts as shown. The sheet metal fairing 30 serves a similar purpose for the stators 12 as each fairing adjacent the rows of turbine rotor and stators conform to the particular envelope size. The above represents the actual construction of the model JT-9D engine, supra, and the details are incorporated by reference herein.

The space between casing 10 and seals 20 are made to define an annular passage and is referred to herein as a double wall construction. To accommodate this invention intercommunication is made with succeeding cavities adjacent the rotors and stators between the double wall construction and this is accomplished by scalloping the inner wall 32 of case 10 and drilling holes 34 in the springs, as shown. Thus flow admitted upstream migrates to the downstream end and eventually dumps in the gas path of the engine. Preferably, the cool air is admitted adjacent the highest pressure of the gas path, whenever this can be accommodated.

In accordance with this invention, cool air is admitted internally of engine case 10 through fitting 40 formed in boss 42. The cooling air which may be obtained either from the fan or compressor is conducted through pipe 44. A suitable valve 46 serves to regulate the flow into the engine. Hence, by regulating the flow, the amount of air from the gas path that is able to leak into the space between the double wall can vary from zero to 100%. Since the temperature of the air in this space directly influences the case 10 it thermally responds thereto to position the seal 20 relative to tip 18 of the rotor 14. Obviously, the valve 46 can be controlled in any well known manner in response to a parameter such as engine speed. Hence during takeoff, for example when the turbine is at its maximum growth, the valve may be turned off and hot air from the gas path leaks into the space for expanding case 10. When in the cruise condition, when the turbine shrinks to a smaller diameter thereby increasing the gap, more cool air is admitted to prevent the hot gases from leaking into this space and for cooling the case and causing it to contract, positioning the seal closer to the tips of the blades. Since the temperature of the air is in intimate contact with the case over a relatively large area and since the case has a fast thermal response, this invention provides means for achieving fast thermal response. Since valve 46 is external of the engine, it can be scheduled to accommodate conditions upon engine deterioration.

It should be understood that the invention is not limited to the particular embodiments shown and described herein, but that various changes and modifications may be made without departing from the spirit or scope of this novel concept as defined by the following claims.

I claim:

1. For a gas turbine engine having a plurality of axially spaced rotors and a case surrounding said axially spaced rotors, a corresponding number of outer air seals between said rotors and said case, means supporting said outer air seals concentrically spaced from said case and defining therewith a double wall construction having an annular passage surrounding said rotors which wall construction includes openings for allowing core air to leak into said annular passage and extending from an upstream to a downstream position relative to the engine's gas path, means external of said case supplying cool air at an upstream position into said annular passage for flowing into the downstream end to the gas path for regulating the leakage of air from said gas path into said annular passage, control means for regulating the flow of said cool air for controlling the temperature in said annular passage for effectuating contraction and expansion of said case, and means interconnecting said outer air seal and said case for positioning said outer air seal relative to the rotors with the contraction and expansion of said case.

2. For a gas turbine engine as in claim 1 including means for sensing an engine operating parameter for controlling said flow regulating means.

3. For a gas turbine engine as in claim 1 wherein said flow regulating means is a valve.

4. For a gas turbine engine as in claim 1 wherein said cool air is obtained from the engine compressor section.

5. For a gas turbine engine as in claim 2 wherein said engine operating parameter is compressor rotational speed.

6. Means for controlling the clearance between an outer air seal and tips of turbine blades axially spaced in at least two rows in a gas turbine engine, a case surrounding said axially spaced rows of turbine blades, a corresponding number of outer air seals mounted between said rows or turbine blades and said case, spring means abutting said case supporting said outer air seals concentrically spaced from said case so that the outer air seal is positioned radially with contraction and expansion of said case and defining therewith a double wall construction having an annular passage surrounding the tips of said turbine blades which double wall construction includes openings for allowing core air to leak into said annular passage and extending from an upstream to a downstream position relative to the engine's gas path, means including valve means external of said case supplying cool air at an upstream position into said annular passage for flowing into the downstream end to the gas path for regulating the leakage of air from said gas path into said annular passge, control means for adjusting said valve from an open to closed position for regulating the flow of said cool air for controlling the temperature in said annular passage by mixing with leakage gas path air for effectuating contraction and expansion of said case, and means responsive to an engine operating parameter for controlling said valve means.

7. Means as in claim 6 wherein said operating parameter is the rotational speed of the compressor of said engine.

* * * * *